Dec. 26, 1950 W. B. STONE 2,535,330

SWINGING TELEPHONE BRACKET

Filed March 28, 1947

INVENTOR
Warren B. Stone
BY Scott L. Norviel
ATTORNEY

Patented Dec. 26, 1950 2,535,330

UNITED STATES PATENT OFFICE 2,535,330

SWINGING TELEPHONE BRACKET

Warren B. Stone, Phoenix, Ariz.

Application March 28, 1947, Serial No. 737,951

1 Claim. (Cl. 179—149)

Figures 1, 2, 3, 4, 5:
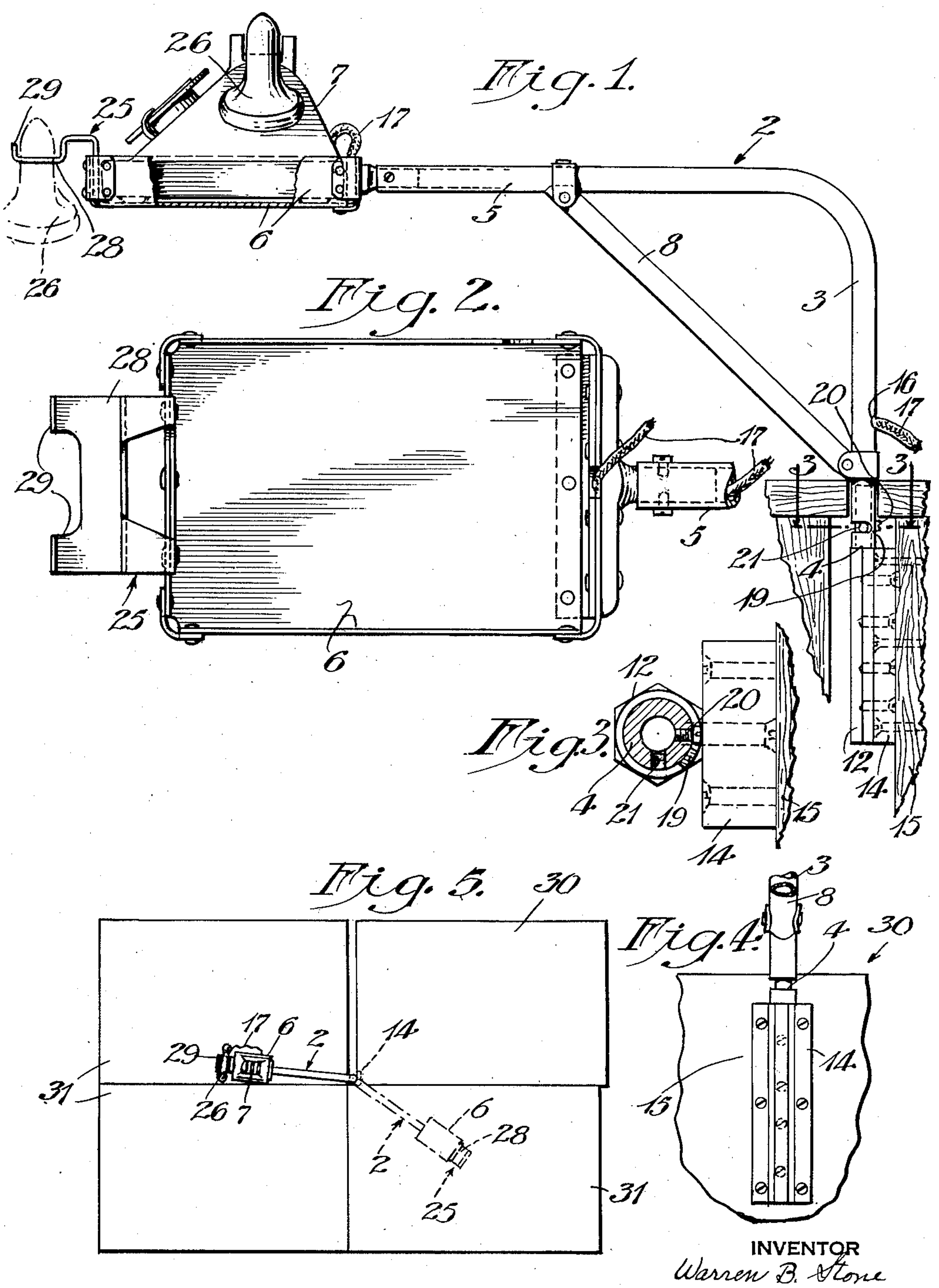

This invention pertains to swinging telephone supporting brackets and has for its objects:

First, the provision of a bracket which may be easily attached for pivotal support to a desk, or a similar object of furniture, and which is provided with a tray adapted to hold a telephone instrument so that it may be swung horizontally to various positions for use;

Second, the provision of a bracket, having upright and horizontal arms adapted for removable pivotal support by said upright arm on a desk, or the like; the horizontal bracket arm being provided with a tray to receive and retain a telephone instrument, of the French type, and equipped with a shelf hook to maintain the transmitter and receiver in convenient usable position when removed from the instrument switch hook;

Third, the provision of a pivotal joint for a swinging telephone bracket, through which the telephone cable may be inserted, and which has means for limiting the swing of a bracket mounted thereon and for retaining the bracket from displacement.

Other objects will appear hereinafter.

I attain the foregoing objects by means of the construction, devices, and arrangement of parts illustrated in the accompanying drawings, in which Figure 1 is a side elevation of my device;

Figure 2 a plan view of the telephone instrument tray;

Figure 3 a plan view of the pivotal support member with the parts sectioned on line 3—3, Figure 1, drawn on an enlarged scale;

Figure 4 a front elevation of the pivotal support, showing particularly the means of attachment to a desk; and Figure 5 a plan view of the bracket, as installed, illustrating its use.

Similar reference numerals refer to similar parts in all views.

The bracket 2 is made of metal tubing and has a vertical arm 3 which is supported at its lower end on a hollow vertical pin bearing 4. Its horizontal arm 5 carries a tray 6, adapted to receive a telephone instrument 7 of the French or hand phone type.

A tubular diagonal brace 8 may be used to maintain these two arms in rigid right angular relation.

Pin bearing 4 is turned on the upper portion of an octagonal bar 12 attached to a plate 14 adapted to be screwed to a vertical portion of a desk 15. The pin bearing may be made hollow, if desired, so that the telephone cord will extend down through the entire bearing, or an exit hole 16 may be provided at a convenient position so that the cord 17 will emerge from the bracket near the axis of pivot. This bearing extends a sufficient distance up into arm 3 to afford adequate support and is sized to form a smooth bearing surface on the interior of the tubing from which the bracket arm is made.

A slot 18 is cut tranversely near the lower end of arm 3 and extends substantially around its circumference. A web 19 is left, however, to form a support for the lower end of the tube. A stop screw 20 is threaded into pin 4, and its head slides in this slot as the bracket arm 3 is revolved on the pin. The screw head retains the arm from displacement and limits its rotation to about 240°. Where change of arcuate swing is desired a second threaded hole, 21, radially positioned in pin 4, may be provided to receive screw 20.

On the front edge of tray 6 a hook bracket 25 is attached and positioned to hold the transmitter-receiver 26 when removed from the instrument hook 27. It is more than a mere hook, but amounts to a horizontal shelf 28 having upraised tabs 29 to retain the handle portion of the transmitter.

In use the plate 14 is screwed or otherwise attached to a desk 30, as shown in Figure 5. Desks 31 may then be grouped adjacent desk 30, as shown, and all users of these desks will have ready access to the telephone instrument. The bracket arm 3 holds the bracket arm 5 and tray 6 a convenient distance above the desk tops, and where one of the users of the telephone answers calls for others the receiver transmitter may conveniently be placed on hook 25 and the instrument pivotally swung to the person for whom the call was intended. Other uses will be obvious.

I realize that various brackets or movable shelves may have been made for various types of telephones, however none of these provide wide arcuate but limited swing, and none are adapted to swing the telephone instrument in usable condition from desk to desk. Therefore I wish to be limited by the following claim.

I claim:

A pivotally swinging bracket for a telephone instrument of the French type having a removable transmitter-receiver joined by a handle, and a rectangular base with attaching cords extending from the back edge thereof, comprising in combination, a bracket element composed of a metal tube, bent at right angles to provide a horizontal arm and adjoining vertical arm with the lower end thereof constituting a bearing and provided with a transverse slot extending throughout approximately 240 degrees of the periphery thereof; a vertical hollow pivot journalled in the lower end of said bracket arm having a radially extending stop screw with its outer end positioned in engagement with said transverse slot on said vertical arm, to retain said arm on said pivot; a horizontal tray attached to the outer end of said horizontal arm adapted to receive and retain the base of said telephone instrument; said bracket element having openings adjacent the edge of said telephone base to admit said telephone instrument cord into the tubular portion thereof; and a shelf-like hook bracket attached to the front of said tray adapted to receive and retain the handle portion of said telephone instrument transmitter-receiver in horizontal position.

WARREN B. STONE.

REFERENCES CITED

The following references are of record in the file of this patent:

UNITED STATES PATENTS

| Number | Name | Date |
|---|---|---|
| 755,581 | Read | Mar. 22, 1904 |
| 1,918,801 | Dilg | July 18, 1933 |
| 2,178,751 | Glasgow | Nov. 7, 1939 |
| 2,320,838 | Watson | June 1, 1943 |

FOREIGN PATENTS

| Number | Country | Date |
|---|---|---|
| 434,686 | Germany | Sept. 30, 1926 |